(12) United States Patent
Noda

(10) Patent No.: US 6,587,218 B2
(45) Date of Patent: Jul. 1, 2003

(54) PRINTING APPARATUS, CONTROLLING METHOD THEREOF, AND RECORDING MEDIUM STORING PRINT CONTROLLING PROGRAM

(75) Inventor: Akihiko Noda, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 09/121,684

(22) Filed: Jul. 24, 1998

(65) Prior Publication Data

US 2002/0075499 A1 Jun. 20, 2002

(30) Foreign Application Priority Data

Jul. 29, 1997 (JP) .............................. 9-202810

(51) Int. Cl.[7] .............................................. G06F 13/00
(52) U.S. Cl. .................... 358/1.15; 358/1.12; 358/1.13; 358/296
(58) Field of Search ................................ 358/1.6, 1.12, 358/1.13, 1.14, 296, 1.15, 498; 399/18, 361, 377, 388, 393, 397, 405

(56) References Cited

U.S. PATENT DOCUMENTS

| 4,511,243 A | * | 4/1985 | Smith ........................ 355/14 |
| 5,640,232 A | * | 6/1997 | Miyake et al. ................ 399/18 |
| 5,774,778 A | * | 6/1998 | Adachi et al. ............... 399/403 |
| 5,823,529 A | * | 10/1998 | Mandel et al. ............... 271/296 |

* cited by examiner

Primary Examiner—Mark Wallerson
(74) Attorney, Agent, or Firm—Fitzpatrick, Cella, Harper & Scinto

(57) ABSTRACT

A printing apparatus prints a plurality of data sets, each being composed of a plurality of pages, to a plurality of paper discharging device. The printing apparatus includes: a plurality of paper discharging device; a determining device that determines whether or not the load of a currently using paper discharging outlet exceeds the maximum permissible load (Smax), if another set of paper sheets following the currently being printed set is discharged to the paper discharging device during the printing operation of a plurality of sets of paper to be outputted, by comparing the maximum permissible load (Smax) and the result of the (Bnow+1) X Pdata, wherein Bnow indicates the number of data sets currently being printed out and Pdata indicates how many pages one data consists of; a control device that, when the first determining device determines that the load of a currently using paper discharging outlet exceeds the maximum permissible load, discharges the next set to another loadable paper discharging device, and stops the currently performing printing operation when it is judged that there is no other loadable paper discharging device.

54 Claims, 12 Drawing Sheets

| Smax |
|------|
| 50 |

| Pdata | Bdata | Bout | Bnow | Pnow |
|-------|-------|------|------|------|
| 11 | 20 | 0 | 0 | 0 |

*FIG. 8*

PRINTING APPARATUS, CONTROLLING METHOD THEREOF, AND RECORDING MEDIUM STORING PRINT CONTROLLING PROGRAM

This application is based on Patent Application No. 202810/1997 filed on Jul. 29, 1997 in Japan, the content of which is incorporated hereinto by reference.

BACKGROUND OF THE INVENTION

1. Field of the Invention

The present invention relates to a printing apparatus, a controlling method thereof, and data recording medium having a print controlling program.

2. Description of the Prior Art

Conventionally, when several sets of data, each comprising a plurality of pages, are to be outputted as print data to a printing apparatus (hereinafter referred to just as a printer) by use of a data processing system (hereinafter referred to just as a host), they have been printed out as shown in FIG. 12.

For example, when three sets of documents, each composed of three pages, are to be outputted, first of all, three first pages are printed out, thereafter three second pages are outputted, and finally three third pages follow thereto. However, this type of printing method is quite inefficient, as it requires human hands later on for putting the thus printed documents in order, so that all the outputted page sheets are distributed to effectively form three sets of pages, each comprising a first, second and third pages. In order to avoid this troublesome job, the printing method has been improved to construct a mechanism in which data are repetitively transmitted from a host computer to a printer, and the thus transmitted data are maintained in the printer and repetitively utilized so that they are outputted per data units as shown in FIG. 13.

In recent years, data processing and documentation at a host computer have become very common, and thus a large number of page sheets are to be printed out. In order to efficiently process such a large number of pages, paper sheet providing section and paper-discharging outlet in a printer have also been made to a plural number. However, for effectively performing the printing process per data units each having several pages by such a printer, it is not sufficient to adopt conventional printing technique, and a new problem will arise therefrom.

For example, assuming that 15 sets (or 15 units) of 11-page data are to be printed by a printer having three paper-discharging outlets, the maximum permissible load of each outlet is 50 sheets. Normally, users need 165 sheets of paper for outputting 15 sets of 11-page data, and in this case they take into consideration the time required for outputting all the data from their experience. However, in the above case, they are likely to start printing without considering as to whether or not any of the paper-discharging outlets will be loaded to capacity, or how the printer acts when they are fully loaded, and so on.

In the current normal condition, 44 sheets made by totaling the first to fourth sets, each consisting of 11 pages, and 6 sheets consisting of first 6 pages of the fifth set, thus 50 sheets altogether, are printed out on to the first paper-discharging outlet. Thereafter, the printer changes the paper-discharging outlet from the first to the second one and starts outputting from the 7th page of the fifth set to a second discharging section. In the similar manner, when the second paper-discharging outlet is loaded to capacity, the printer moves on to the third paper-discharging outlet to output the rest. However, when the third paper-discharging outlet becomes fully loaded, the printer stops its outputting operation.

As described above, when all the paper-discharging outlets are brought to a fully loaded state, users have to take away the outputted sheets of paper accumulated thereon. However, in a case in which only one printer is used by a plurality of users, if this paper sheet removing operation is not performed in time, other data which has been spooled and planned to be outputted by another user is also stopped. Specially, in a case in which one printer is commonly used in a network or the like, the users, who carry out the printing operation often from a physically remote place from the printer, are often late for discovering the state that the printing operation has been stopped, and thus they cannot efficiently cope with the situation. For this reason, this printing-operation stopped state affects a lot, and is thus likely to deteriorate the operability as a whole.

Further, as the printer changes the currently using paper-discharging outlet to another in the moment that the current outlet becomes loaded to full capacity, pages composing one data unit are distributed to a plurality of paper-discharging outlets. In the above example, although the 1st page to the 6th page of the fifth set are discharged to the first paper-discharging outlet, the 7th page to the 11th are discharged to the second paper-discharging outlet. For this reason, if the user makes a mistake in the piling order for adjusting the discharged sheets accumulated in the paper-discharging outlet, the page numbers are disordered, and thus the purpose to properly distribute the sheets of paper per data units cannot be attained. In addition, the user has to check the piling order after the discharging of the sheets of paper, which is an additional burdensome work for the user.

SUMMARY OF THE INVENTION

The present invention has been achieved to solve the above-described problem and an object of the present invention is to provide a printing apparatus and a control method thereof, together with a recording medium containing a program for controlling a printing operation.

In order to solve the problems aforementioned, the printing apparatus according to the first aspect of the present invention is constructed such that it comprises: a plurality of paper discharging means; a detecting means for detecting the load on each of the paper discharging means; a first judging means that judges whether or not the load of a currently using paper discharging means will exceed a predetermined maximum permissible load, if another set of paper sheets following the currently being printed set is discharged to the paper discharging means, during the printing operation of a plurality of sets of paper to be outputted; a control means that, when the first judging means judges that the load on the currently using paper discharging means will exceed the maximum permissible load, discharges the next set to another loadable paper discharging means, and stops the currently performing printing operation when there is no other loadable paper discharging means.

The detecting means of the printing apparatus as constructed above further comprises: a counting means for counting the number of printed sets of data currently being processed, and a page information obtaining means for obtaining number of pages to be printed out.

A print controlling method according to the second aspect of the present invention is constructed such that it comprises the steps of: judging whether or not the load of a currently using paper discharging means will exceed a predetermined maximum permissible load, if another set of paper sheets following the currently being printed set is discharged to the paper discharging means, during the printing operation of a plurality of sets of paper to be outputted; discharging the next set to another loadable paper discharging means when it is judged that the load on the currently using paper discharging means will exceed the maximum permissible load; and stopping the currently performing printing operation when there is no other loadable paper discharging means.

In the print controlling method as constructed above, the detection is carried out based on the information obtained from a means for counting the number of printed sets of data currently being processed, and from a counting means for obtaining number of pages to be printed out.

A recording medium according to the third aspect of the present invention, which is for storing a control program for executing a print control program by a computer or the like is constructed such that the control program makes the computer: judging whether or not the load of a currently using paper discharging means will exceed the maximum permissible load, if another set of paper sheets following the currently being printed set is discharged to the paper discharging means, during the printing operation of a plurality of sets of paper to be outputted; discharging the next set to another loadable paper discharging means when it is judged that the load on the currently using paper discharging means will exceed the maximum permissible load; and stopping the currently performing printing operation when there is no other loadable paper discharging means.

A method of controlling a printing apparatus having a plurality of paper discharging means for loading printed sheets according to further aspect of the present invention comprising the steps of: executing printing operation; recognizing the current load of printed sheets on a paper discharging means to which sheets to be printed of the next group are to be discharged, and the amount of the sheets to be printed of the next group; judging whether or not the total amount of sheets will exceed a predetermined permissible load of sheets if the sheets to be printed of the next group are loaded on the current paper discharging means, on the basis of the current amount of printed sheets loaded on the paper discharging means and that of the sheets to be printed of the next group, both recognized in said step for recognizing; and controlling such that the sheets to be printed of the next group are discharged to the current paper discharging means if it is judged in said judging step that the total mount of sheets will not exceed the predetermined permissible load, and that the sheets to be printed of the next group are not discharged if it is judged that the total amount of sheets will exceed the predetermined permissible load.

A recording medium for storing a control program for executing a print control program by a computer according to still further aspect of the present invention contains a control program that makes the computer: executing printing operation; recognizing the current load of printed sheets on a paper discharging means to which sheets to be printed of the next group are to be discharged, and the amount of the sheets to be printed of the next group; judging whether or not the total amount of sheets will exceed a predetermined permissible load of sheets if the sheets to be printed of the next group are loaded on the current paper discharging means, on the basis of the current amount of printed sheets loaded on the paper discharging means and that of the sheets to be printed of the next group, both recognized in the step for recognizing; and controlling such that the sheets to be printed of the next group are discharged to the current paper discharging means if it is judged in the judging step that the total mount of sheets will not exceed the predetermined permissible load, and that the sheets to be printed of the next group are not discharged if it is judged that the total amount of sheets will exceed the predetermined permissible load.

By use of the present invention, a plurality of printed sheets of paper can be loaded per units on each of the paper-discharging outlets of a printer, and when all the paper discharging outlets get fully loaded during the printing operation, the printing operation is automatically interrupted, so that the sheets of paper within one data unit are not separately distributed to different paper-discharging outlets. Further, in the moment that all the paper-discharging outlets are fully loaded during the printing operation, and the printing operation is automatically interrupted, it is instantly informed to the user. For this reason, the user can immediately cope with the full-up state of the paper-discharging outlet, and thus can effectively print per data units, eliminating simultaneously a deterioration of workability of other users. Still further, as no pages constructing one unit are separately distributed to a plurality of paper discharging outlets, a confirmation of page numbers during the page adjusting operation of the discharged sheets of paper can be omitted, thereby the page arrangement after printing is largely facilitated.

The above and other objects, effects, features and advantages of the present invention will become more apparent from the following description of embodiments thereof taken in conjunction with the accompanying drawings.

BRIEF DESCRIPTION OF THE DRAWINGS

FIG. 8 is an illustration showing a data structure according to one embodiment of the present invention;

DETAILED DESCRIPTION OF THE PREFERRED EMBODIMENTS

One embodiment of the present invention is now explained into details with reference to the attached drawings.

Figure 1:
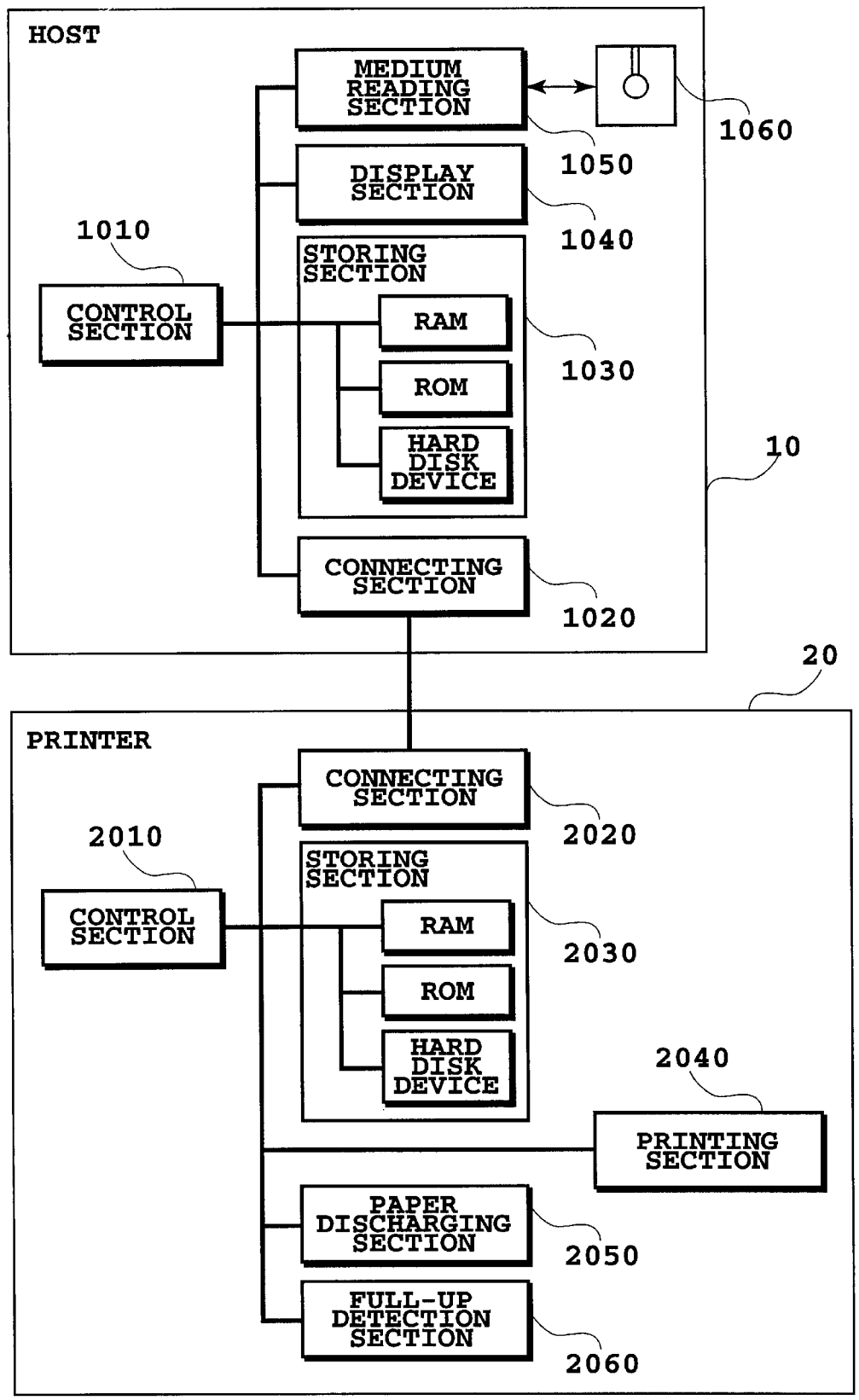
FIG. 1 is schematic view showing a construction of a data processing system according to one embodiment of the present invention.

FIG. 1 is a schematic view showing a construction of a data processing system according to one embodiment of the present invention. This data processing system comprises a host computer (host) 10 and a printer 20.

Host 10 comprises a control section 1010, a connecting section 1020 to be connected to the printer 20, a storing section 1030, a display section 1040, recording medium reading section 1050 and a recording medium 1060.

Printer 20 further comprises a control section 2010, a connecting section 2020 to be connected to the host 10, a storing section 2030, a display section 2040, paper-discharging outlet 2050 and a full-up detection section 2060.

Figure 8:
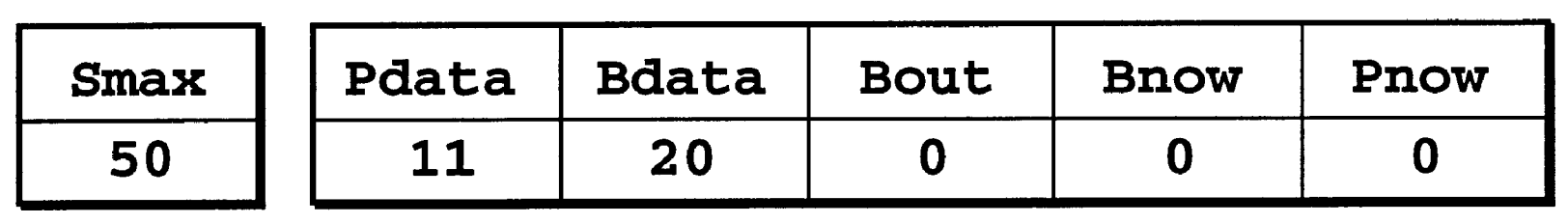

The information regarding the maximum permissible load (hereinafter may be referred to just as Smax) of the paper discharging outlet of a target printer is stored in the form of a data structure as shown in FIG. 8 in the ROM of the storing section 1030 of the host 10 in FIG. 1, and data to be printed out is stored in the hard disk device of the same storing section 1030. The printer for printing out the data comprises three paper-discharging outlets as shown in before-mentioned FIG. 14, which are all in the state that there are no paper loaded thereon, and it is arranged such that a first paper discharging outlet (the uppermost one in the figure) is initially used as its paper discharging outlet.

Figure 2:
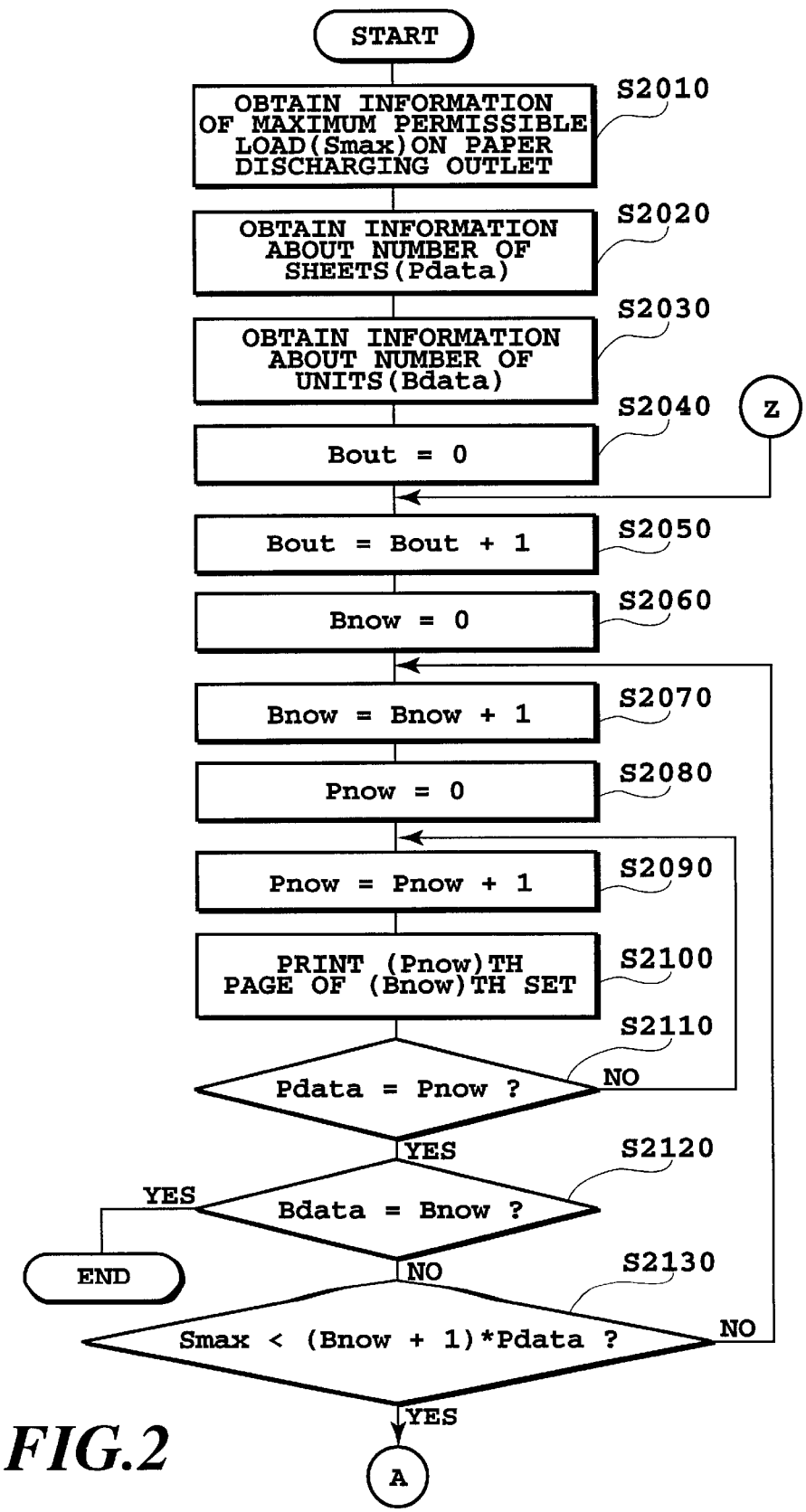
FIG. 2 is a flowchart showing a controlling module executed within the data processing system according to one embodiment of the present invention.
Figure 3:
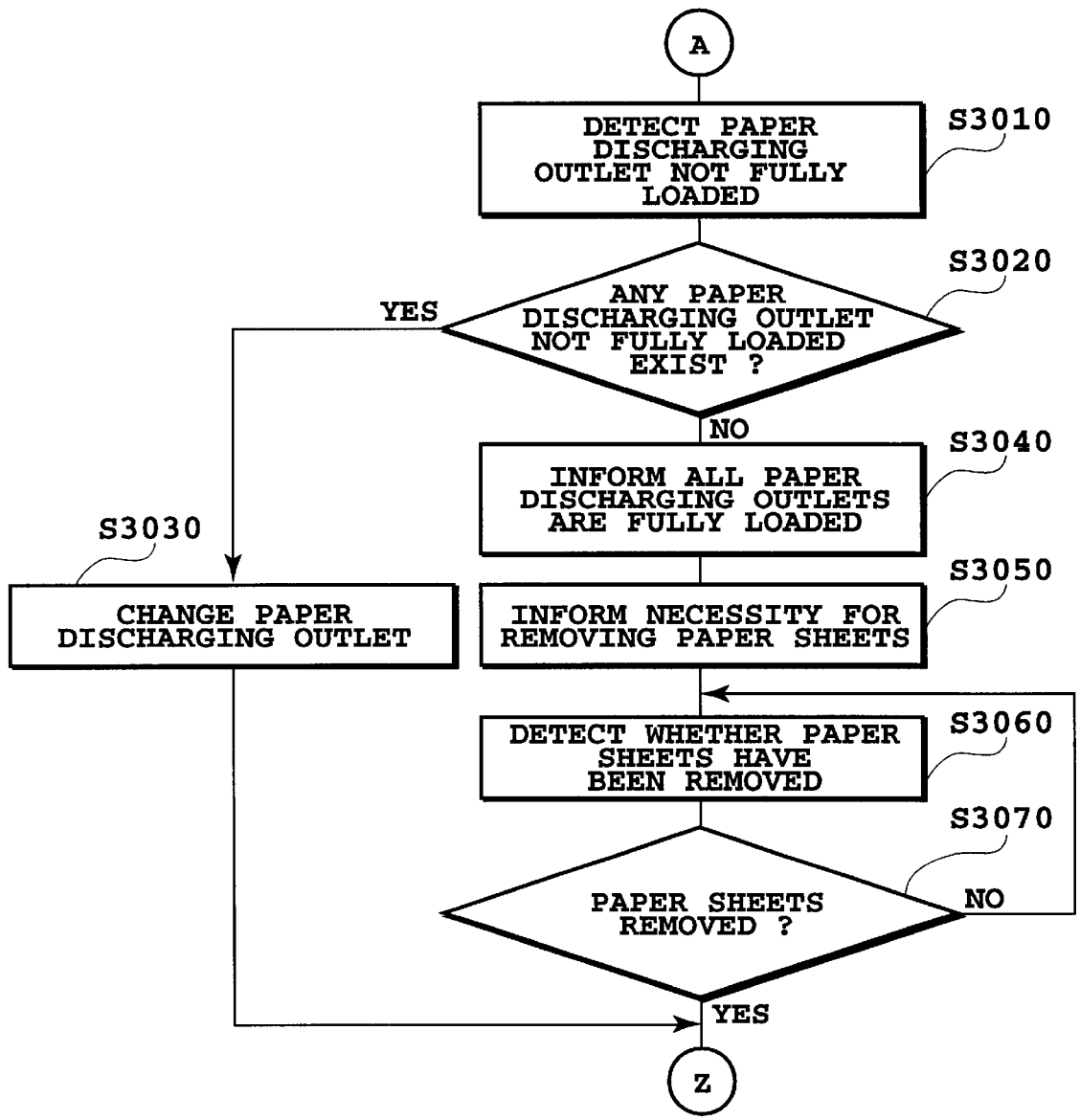
FIG. 3 is a flowchart showing another controlling module executed within the data processing system according to one embodiment of the present invention.

The control program module from S2010 to S2130 (here "S" stands for "step") in FIG. 2, and S3010 to S3070 in FIG. 3, respectively for the control section 1010 and other control section 2010 are stored in the ROM of the storing section 1030 of the host 10, wherein the module is read out from the ROM to the RAM in the same storing section 1030 when the host is powered on.

Figure 9:
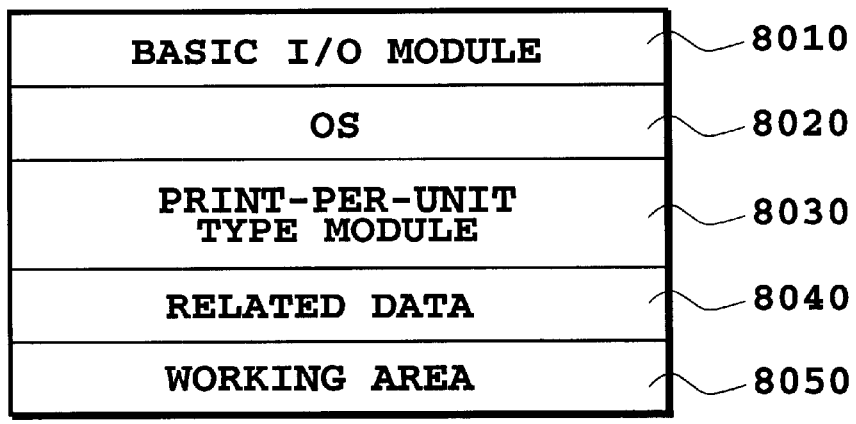
FIG. 9 is a memory map of a module for use in one embodiment of the present invention.
Figure 10:
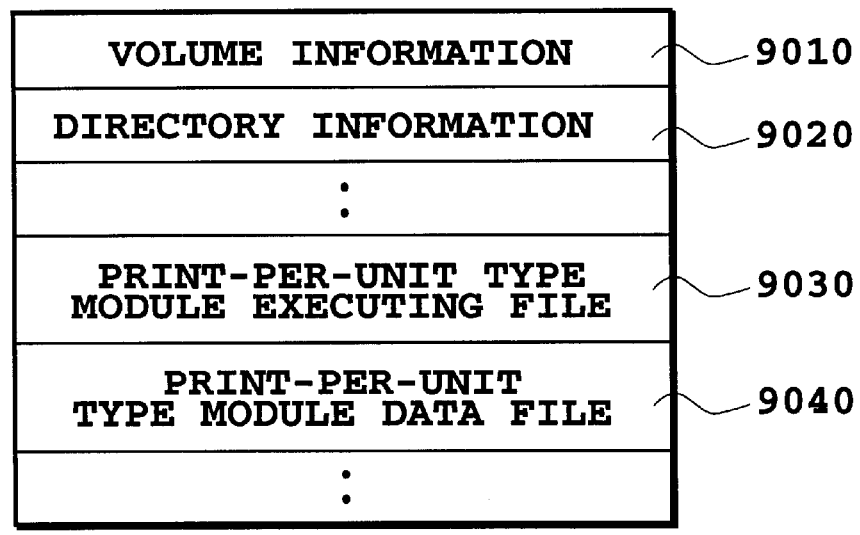
FIG. 10 is an illustration showing a structure of a recording medium on which a module for use in one embodiment of the present invention is recorded.
Figure 11:
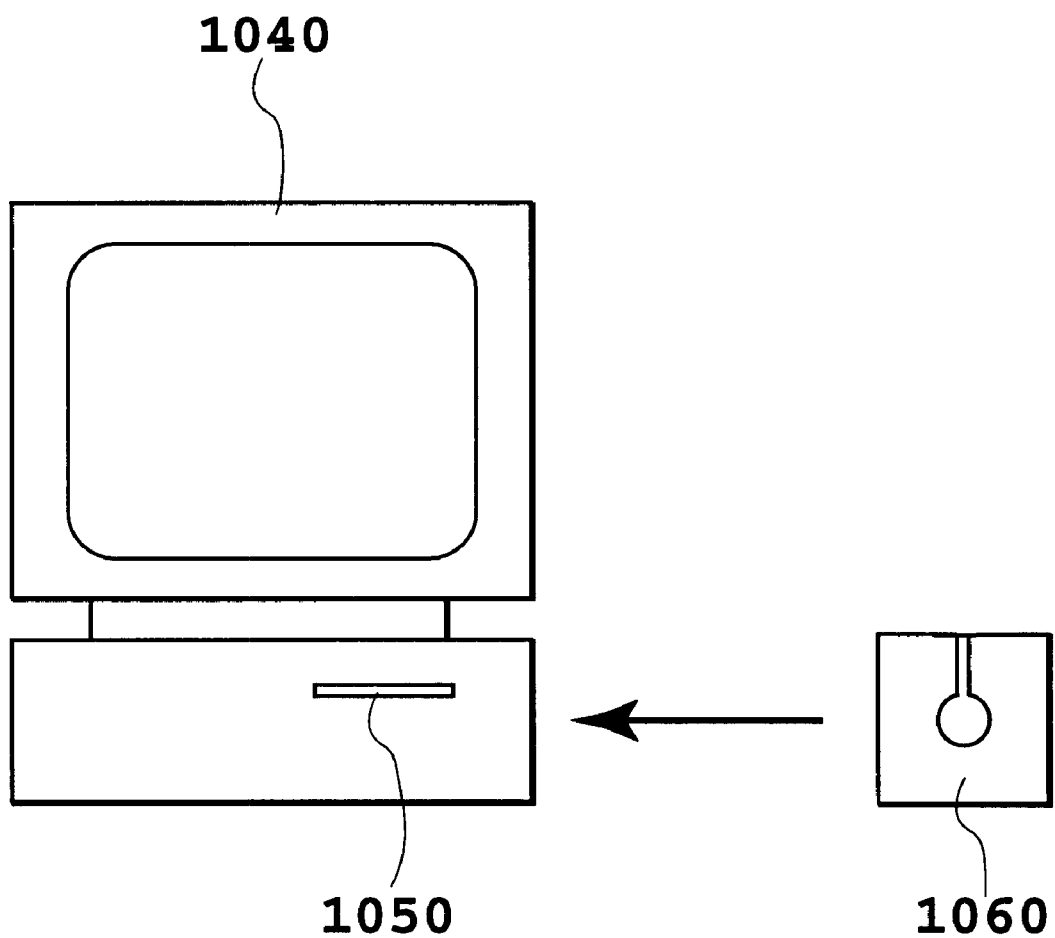
FIG. 11 is an illustration showing a state in which a module is provided to the host from the recording medium on which the module for use in one embodiment of the present invention is recorded.
Figure 12:
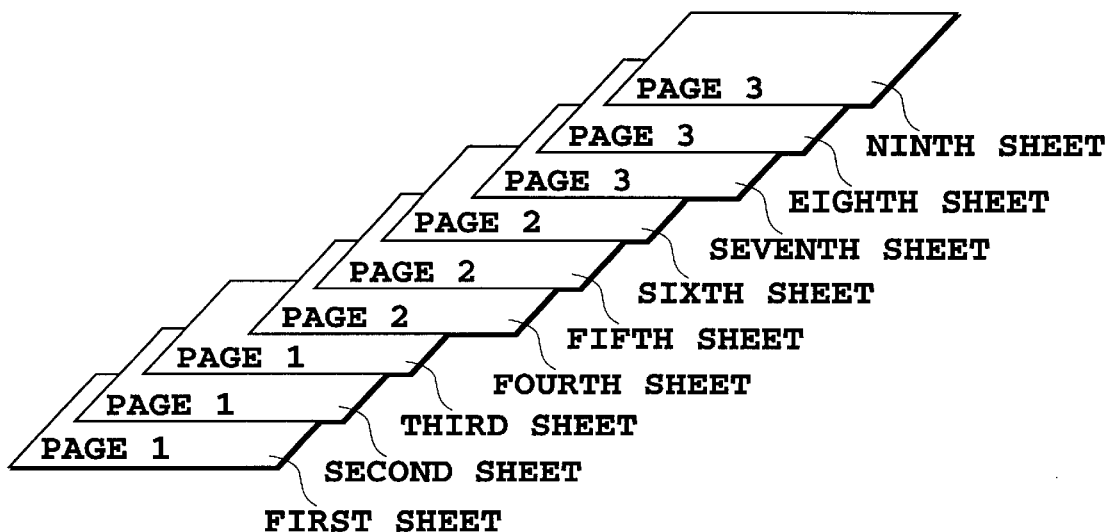
FIG. 12 is an illustration showing a conventional printing order of sheets of paper per units.
Figure 13:
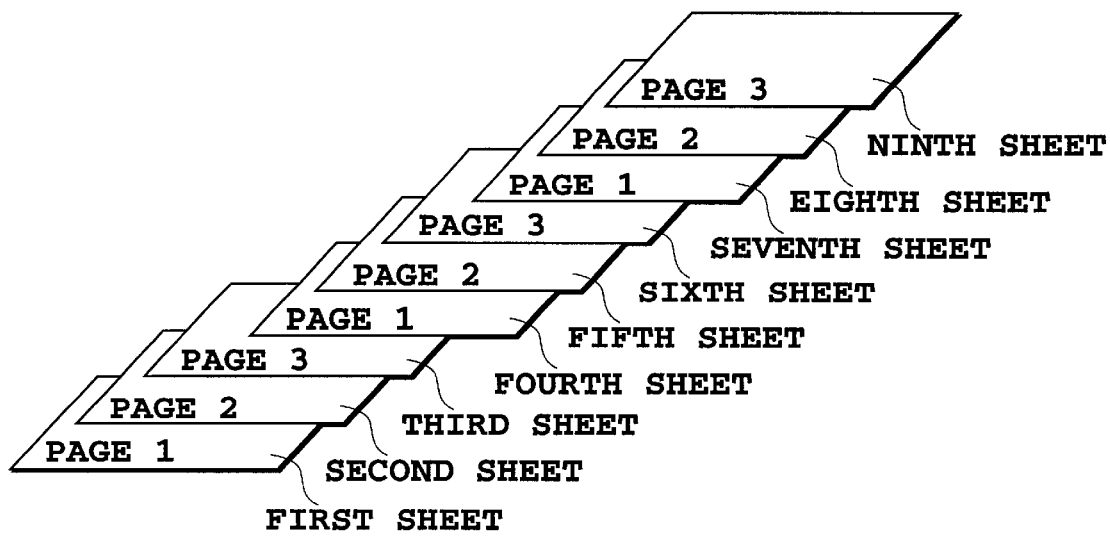
FIG. 13 is an illustration showing one printing order of sheets of paper per units.

Apart from this, it is also enabled such that the module and related data for the control sections 1010 and 2010 are read out from the recording medium reading section 1050 of the host 10 and stored in the RAM of the storing section 1030 of the host to be executed. Namely, as shown in FIG. 11, the module and related data for the control sections 1010 and 2010 are preliminarily recorded in the recording medium 1060, and the thus recorded content is of such a structure as that shown in FIG. 10. In this case, the module and related data for the control sections 1010 and 2010 preliminarily recorded on the recording medium 1060 can be loaded into the RAM of the storing section 1030 of the host 10 by way of the recording medium reading section 1050. When this recording medium 1060 is inserted into the recording medium reading section 1050, under the OS and a basic I/O program, the module and related data for the control sections 1010 and 2010 are read out from the recording medium 1060, and are loaded into the RAM of the storing section 1030 of the host. FIG. 9 indicates a memory map of the controlling module in which such necessary data are loaded into the storing section 1030 of the host and the module is in an operable state.

Further, it can also be arranged such that the module and related data for the control sections 1010 and 2010 recorded in the recording medium 1060 are installed once in the hard disk device of the storing section 1030 of the host, and that when the module and related data for the control sections 1010 and 2010 are activated, they are loaded into the RAM in the storing section 1030 of the same from the hard disk device.

It is to be noted that the control module for the control sections 1010 and 2010 is program coded on the basis of the flowchart (from S2010 to S2030, and from S3010 to S3070) shown in FIG. 2 and FIG. 3.

Considering the above-described facts, the procedure for printing 15 sets of 11-page data is now explained.

Figure 14:
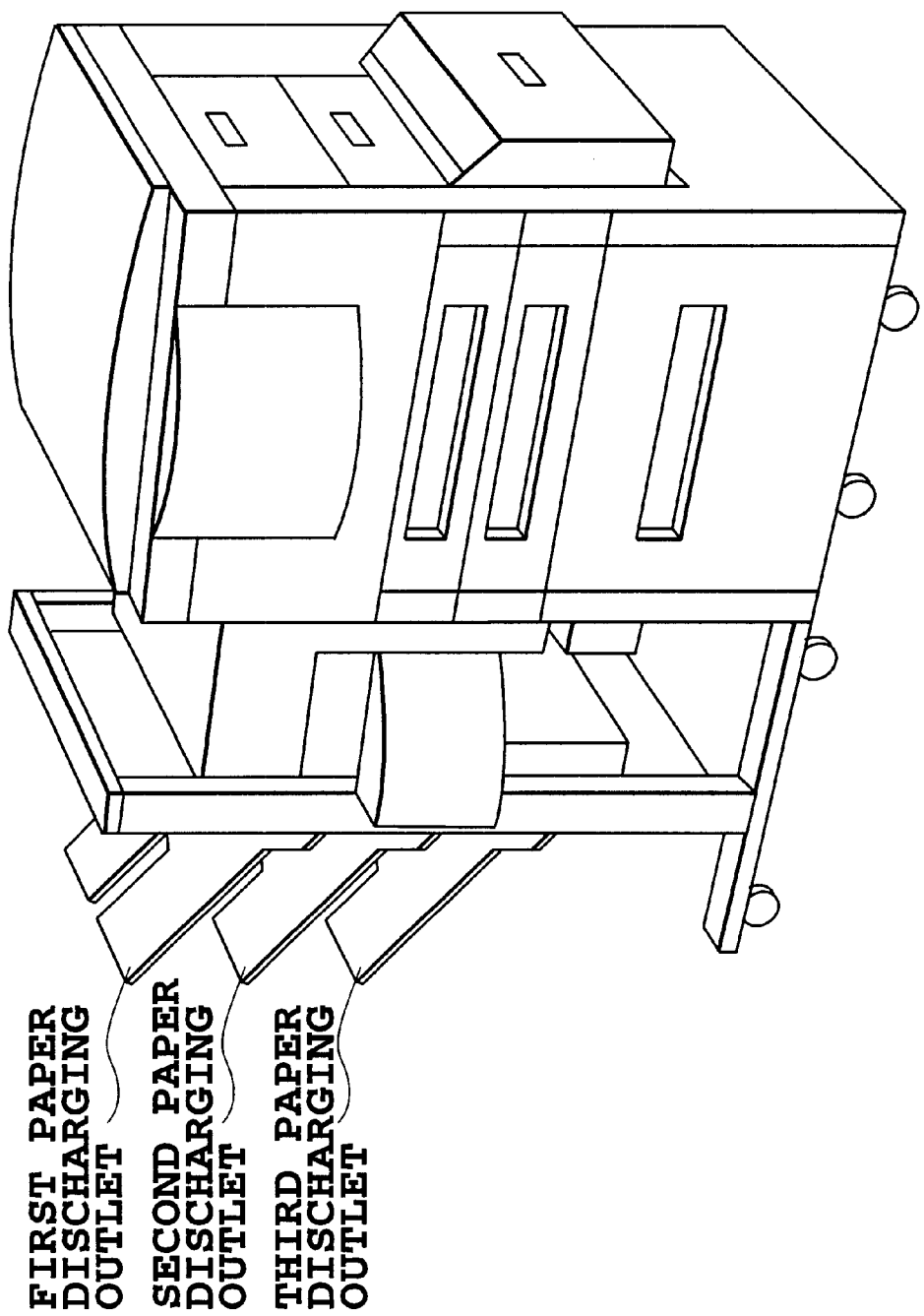
FIG. 14 is an illustration showing a plurality of paper-discharging outlets of the printer according to one embodiment of the present invention.

First of all, the control section 1010 of the host (hereinafter may be referred to just as host control section) obtains the data of maximum permissible load (Smax) of the paper-discharging outlet in a target printer as shown in FIG. 14 from the ROM of the storing section 1030 of the host, and stores the thus obtained data into the RAM of the storing section 1030 (S2010). Here, the value of Smax is 50 (Smax=50).

Then, the host control section 1010 checks the data to be printed stored in the disk device of the storing section 1030 of the host, obtains the page data (Pdata) that indicates how many pages the data consists of, and then stores the thus obtained data into the RAM of the storing section 1030 of the host (S2020). Here, the value of Pdata is 11 (Pdata=11). Thereafter, the host control section 1010 checks the data to be printed stored in the hard disk device of the storing section 1030, obtains the number of sets of data (or simply "data units") to be printed (Bdata), and then stores the thus obtained data into the RAM of the storing section 1030 (S2030). Here, the value of Bdata is 15 (Bdata=15).

Thereafter, the host control section 1010 sets "0" for the counted number of the outputted data units Bout in order to reset it (S2040), adds "1" to Bout so as to indicate that the printing process of one set is started, and stores it in the RAM of the storing section 1030 of the host (S2050). Here, the value of Bout becomes 1 (Bout=1), meaning that the first set out of 15 sets is now being processed to be printed out.

Then, the host control section 1010 sets "0" for the counted number of the sets Bnow outputted to the currently using paper-discharging outlet in order to reset it (S2060), adds "1" to Bnow so as to indicate that the printing process of one set is started, and stores it in the RAM of the storing section 1030 of the host (S2070). Here, the value of Bnow becomes 1 (Bnow=1), meaning that the first set is now being processed to be outputted to the first paper-discharging outlet.

Thereafter, the host control section 1010 sets "0" for the counted number of the outputted pages Pnow in order to reset it (S2080), adds "1" to Pnow so as to indicate that the printing process of the first page is started, and stores it in the RAM of the storing section 1030 of the host (S2090). Here, the value of Pnow is 1 (Pnow=1), meaning that the first page out of 11 pages is now being processed to be printed out.

Then, the host control section 1010 reads out the data of the (Pnow)th page of the (Bnow)th set from the hard disk device in the storing section 1030 of the host, and transmits it to the control section 2010 of the printer 20. Thereafter, the control section of the printer (hereinafter referred to just as printer control section) 2010 stores the thus obtained data into the RAM of the storing section 2030 of the printer. Then, the printer control section 2010 transmits the data one by one to the printing section 2040 of the printer to process the data, and outputs the printed sheets of paper to the first paper-discharging outlet (S2100).

Then, the host control section 1010 judges whether the value of Pdata stored in the RAM of the storing section 1030 of the host is same as the value of Pnow so as to judge whether or not the printed page is the last one to be printed out (S2110). In this case, the host control section 1010 judges that they are not same as each other, as Pdata=11, and Pnow=1.

After this processing step (S2110), the control section 1010 of the host repeats the processing steps S2090 to S2110 until the value of Pnow becomes 11. Then, when the value of Pnow becomes 11 (Pnow=11), the host control section 1010 determines that the value of Pdata and Pnow are now identical.

Thereafter, the host control section 1010 judges whether the value of Bdata stored in the RAM of the storing section 1030 of the host is same as the value of Bout (S2120) so as to judge whether the number of the printed data units equals to the preliminarily designated number of data units. In this case, the host control section 1010 judges that they are not same as each other, as Bdata=15, and Bout=1. At this moment, printing out of the first set of 11 pages to the first paper-discharging outlet is completed.

Thereafter, in order to judge whether the number of outputted pages will exceed the maximum permissible load (Smax) in case another data unit (another one set) is outputted to the first paper-discharging outlet, the host control section 1010 judges whether or not the (Bnow+1)×Pdata is larger than Smax. Here, since Smax=50 [(because, (Bnow+1)×Pdata=22 (wherein Bnow=1, Pdata=11)], the host control section 1010 judges that even in case another set of data is outputted to the current paper-discharging outlet, it will not exceed the Smax (S2130), and the procedure returns to step S2070.

After this procedure, step S2070 to step S2130 are repeated until the value of Bout becomes 4 (Bout=4), and at the moment that the value of Bout becomes 4, the host control section 1010 judges in step S2130 that if another data unit is outputted to the paper-discharging outlet, the value of (Bnow+1)×Pdata will be 55 (wherein Bnow=4, Pdata=11), and thus exceeds the Smax (=50), and the procedure advances to step S3010.

In step S3010, the host control section 1010 refers to the printer control section 2010 whether there is any paper-discharging outlet which is not fully loaded by way of the connecting portions 1020 and 2020. The printer control section 2010 checks all the paper discharging section provided to the paper-discharging outlet 2050 as to whether or not they are fully loaded with the outputted sheets of paper by the full-up detection section 2060. The printer control section 2010 informs the result of the detection to the host control section 1010 by way of the connecting portions 2020 and 1020 (S3010). In this case, it is informed that the second paper-discharging outlet is not fully loaded.

Next, the host control section 1010 judges in step S3020 that there is a paper discharging outlet which is not yet fully loaded in the printer on the basis of the result informed by the printer control section 2010 (S3020), changes thereafter the current paper-discharging outlet from the first to the second (S3030), and then returns to step S2050. At this moment, the first paper-discharging outlet is loaded with outputted 4 sets, and several pages from the first page of the fifth set are discharged to the second paper discharging outlet, so that pages in one data unit in the correct order are never separately distributed to a plurality of paper-discharging outlets.

After this step, the host control section 1010 repeats the procedures from step S2070 to S2130 until the value of Bout becomes 8 (which is the sum of the previous 4 sets and the current value of Bout 4).

Then, at the moment that the value of Bout has become 8, the host control section 1010 executes the procedure from step S3010 to S3030 and is informed from the printer control section S2010 that the third paper discharging outlet is not fully loaded.

Then, the host control section 1010 changes the current paper-discharging outlet from the second to the third, and the procedure returns to step S2050. At this moment, there are 8 sets of outputted paper on the paper discharging outlets; namely 4 in the first and another 4 in the second discharging outlet.

Thereafter, the host control section 1010 repeats the procedures from step S2070 to S2130 until the value of Bout becomes 12. At the stage where the above procedure has finished, there are 12 sets of outputted paper on the paper discharging outlets; namely 4 in the first and 4 in the second, and another 4 in the third discharging outlet.

Next, in step S3010, the host control section 1010 refers to the printer control section 2010 whether there is any paper-discharging outlet which is not fully loaded by way of the connecting portions 1020 and 2020. The printer control section 2010 checks all the paper discharging outlets provided to the paper-discharging section 2050 as to whether or not they are fully loaded with the outputted sheets of paper by the full-up detection section 2060. However, since all the paper discharging outlets are loaded to capacity, the printer control section 2010 informs the result of the detection to the host control section 1010 by way of the connecting portion 1020 of the printer and the connecting portion 1010 of the host. In this case, it is informed that all the paper-discharging outlets are fully loaded.

Thereafter, the host control section 1010 judges that all the paper discharging outlets of the printer are fully loaded on the basis of the result informed by the control section 2010 (S3020), and informs it to the user by way of the display section 1040 of the host (S3040), and also notifies that it is required to remove some of the outputted sheets of paper (S3050).

By this operation, as soon as all the paper discharging outlets of the printer are fully loaded, the user is informed of this, so that the necessary procedure including a prompt paper removing operation by the user is enabled.

Thereafter, in step S3060, the host control section 1010 refers to the printer control section 2010 whether or not the outputted sheets of paper have already been removed by way of the connecting portions 1020 and 2020. The printer control section 2010 detects whether or not the outputted sheets of paper have been removed from all the paper discharging outlets provided in the paper-discharging section 2050 by the full-up detection section 2060. The printer control section 2010 informs it to the host control section 1010 by way of the printer connecting portion 2020 and the host connecting portion 1020. In this case, it is informed as soon as all the outputted sheets of paper loaded in the paper discharging outlets are removed.

Then, the host control section 1010 determines that all the outputted sheets of paper have been removed on the basis of the result informed by the printer control section 2010 (S3070), and the procedure returns to step S2050.

Thereafter, the host control section 1010 repeats the procedure from step S2070 to step S2130 until the value of Bout becomes 15, and in case at the moment that the value of Bout becomes 15, it judges in step S2120 that the value of Bout has reached to that of Bdata (=15), and since the printing out of all the data units to be outputted is completed, the procedure terminates here.

By the way, the means for detecting whether or not the paper discharging outlets are fully loaded or whether the paper sheets loaded thereon have been removed may include: a counter for counting the number of paper sheets in response to each outputting operation of the paper sheets to the paper discharging outlet by use of hardware or software; a sensor such as a photosenser provided near the paper discharging outlet for detecting the paper sheet loading state thereon; and a resetting member for resetting the counter when no more loading of the paper sheets is detected; all of which can be one part of the full-up detection section.

Further, in the above embodiment, although it is arranged such that a plurality of sets of paper sheets are not separately distributed to a plurality of paper discharging outlets, it can also be arranged such that even when paper sheets on which the next job is printed are to be outputted to a paper discharging outlet on which already-discharged paper sheets are accumulated, they are not separately distributed to a plurality of paper discharging outlets.

In this case, it is preferable that the load on the outlet is recognized by a sensor that detects the height of the piled up paper sheets, and is also preferable to judge before starting the printing operation of the next job that even if the paper sheets for the next job are discharged to the current discharging outlet, the outlet is not going to be fully loaded, on the basis of the result of a comparison between the current load and the amount of the paper sheets for the next job to be discharged.

In this manner, paper sheets comprising one group of data can be prevented from being distributed to a plurality of paper discharging outlets.

[Other Embodiments]

Figure 4:
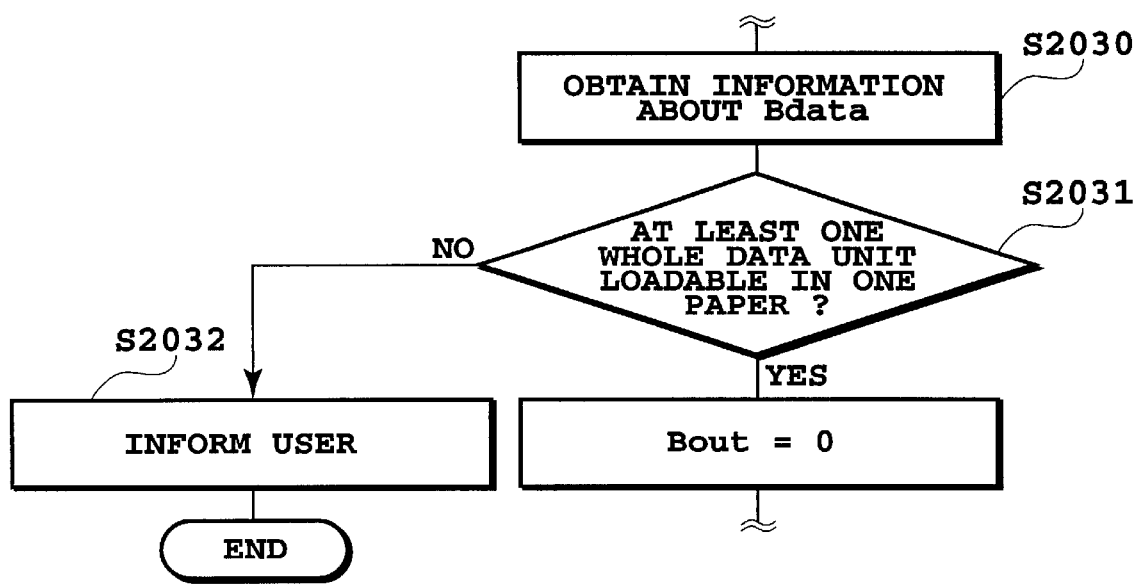
FIG. 4 is a flowchart showing a controlling module executed within the data processing system according to a second embodiment of the present invention.

As the second embodiment of the present invention, one step S2031 for detecting whether or not it is possible to load at least all the sheets of paper of one set on one paper discharging outlet is added after step S2031 of the first embodiment as shown in FIG. 4.

In the first embodiment, the printing procedure advances, detecting at the same time whether or not all the paper discharging outlets are fully loaded. For this reason, in case of printing 2 sets of 60 pages in the same state of the first embodiment, the procedure is interrupted by an error that occurs even only when the 51st page is to be printed out. However, by detecting in this step S2031 whether the paper discharging outlet is fully loaded before starting the printing procedure, even in a case in which it is judged that all pages of one set cannot be loaded on one paper discharging outlet, the user is informed of this fact by for example indicating a message on a display section 1040 provided in the host 10, and can cope with the situation.

Figure 5:
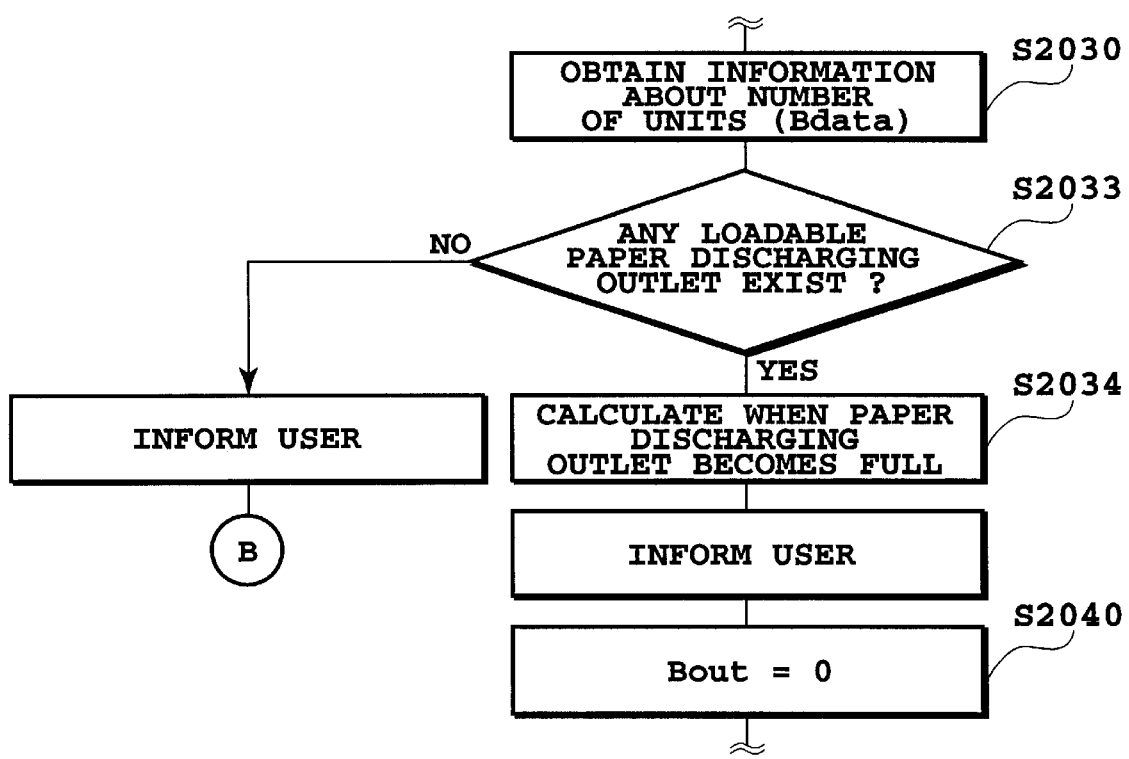
FIG. 5 is a flowchart showing a controlling module executed within the data processing system according to a third embodiment of the present invention.

Further, as the third embodiment, on the assumption that all the paper discharging outlets are fully loaded in a state that all the paper discharging outlets are used, not only detecting whether or not the paper discharging outlets are loaded to capacity before all the data units are printed out, but also checking in step S2033 whether there is any still loadable paper discharging outlet left as shown in FIG. 5, and thereafter calculates in step S2034 when the paper discharging outlet will be fully loaded, (for example such information as it becomes full when printing the 13th set, or it becomes full after 10 minutes, or the combination thereof and so on), and provide the thus calculated result to the user, so that the user can efficiently improve his workability.

Figure 6:
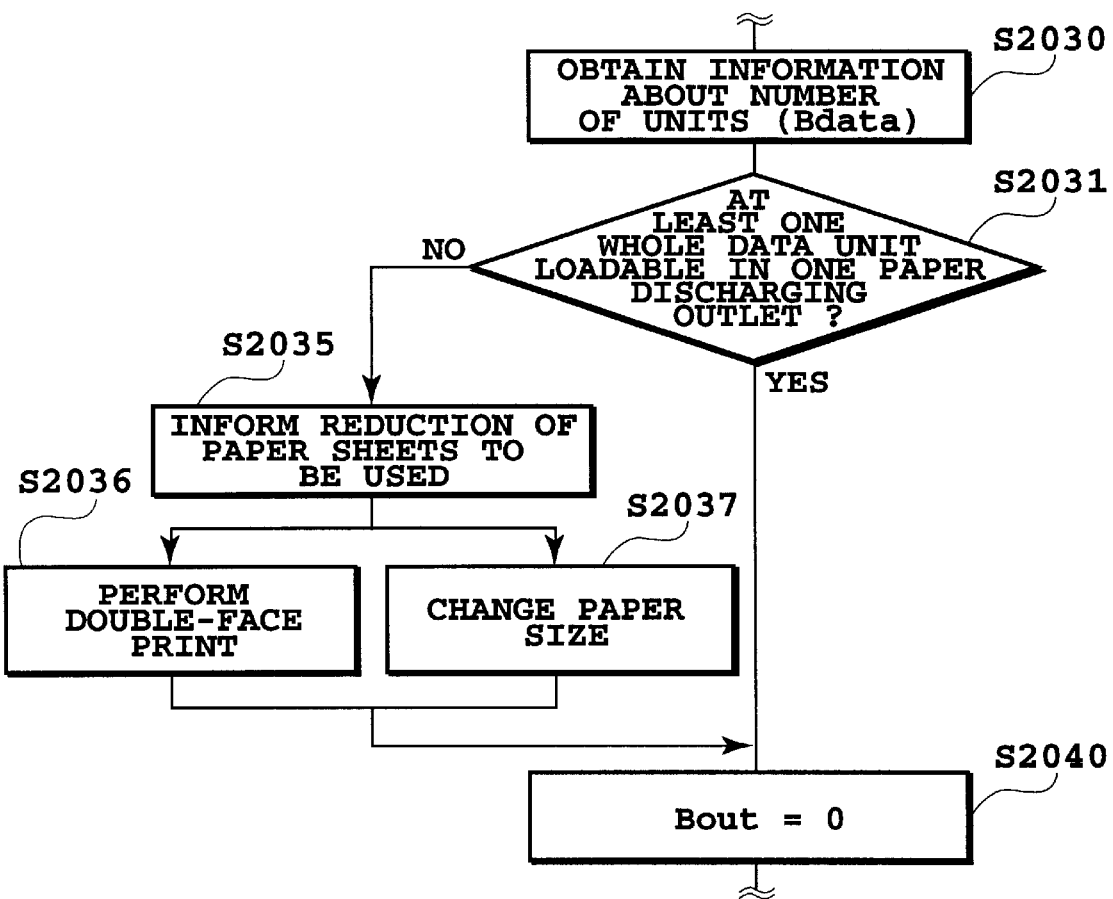
FIG. 6 is a flowchart showing a controlling module executed within the data processing system according to a fourth embodiment of the present invention.

As the fourth embodiment of the present invention, one step S2035 for reducing the number of pages to be printed out is added after step S2031 of the second embodiment as shown in FIG. 6.

In the first embodiment, one face of A4-size paper is used to print out, which is a quite normal way of printing. However, when it is judged before starting any printing operation that the loaded state of the paper-discharging outlet is checked, and that there will be definitely caused a fully loaded state in the paper-discharging outlet in the normal printing way, then the number of paper to be outputted is reduced by printing the both faces of each paper, which is performed in a newly added step S2036 in FIG. 6. For this reason, by performing a double-face printing to each paper in a case in which 15 sets of 11-opage data are to be printed out, number of sheets of paper required for outputting one set is reduced from 11 to 6, so that up to 8 sets can be loaded onto one paper-discharging outlet. As a result, 8 sets in the first paper-discharging outlet and 7 sets in the second paper-discharging outlet can be loaded, thereby the full-up state can be avoided.

Further, as the number of page reducing operation, apart from the double-face printing, paper of an enlarged size, which is an integer-time enlarged size of the normal A4-size, can be used without changing the size of data as shown in step S2037 in FIG. 6. For example, there are methods in which two A4-size data are laid out on A3-size paper, or four A5-size data are laid out on one A3-size paper and so on. Even the combination thereof is also possible.

Still further, there is also another method for reducing the number of pages in which without changing the size of paper to be outputted, the size of the data is minimized. For example, two A4-size data are each minimized to A5-size, and are laid on one A4-size paper, or four A4-size data are each minimized to A5 size, and are laid out on one A3-size paper and so on. Even the combination thereof is also possible.

By automatically performing this type of arrangement, the full-up state of the paper-discharging outlet can be avoided, and the material such as paper on which data are printed can be effectively saved. After this operation, the procedure advances to step S2040, and thereafter performs the similar operation as those shown in FIGS. 2 and 3.

Further, in this embodiment, it can also be arranged such that the user is informed beforehand, in order to select whether he accepts the step of reducing the number of paper sheets.

Figure 7:
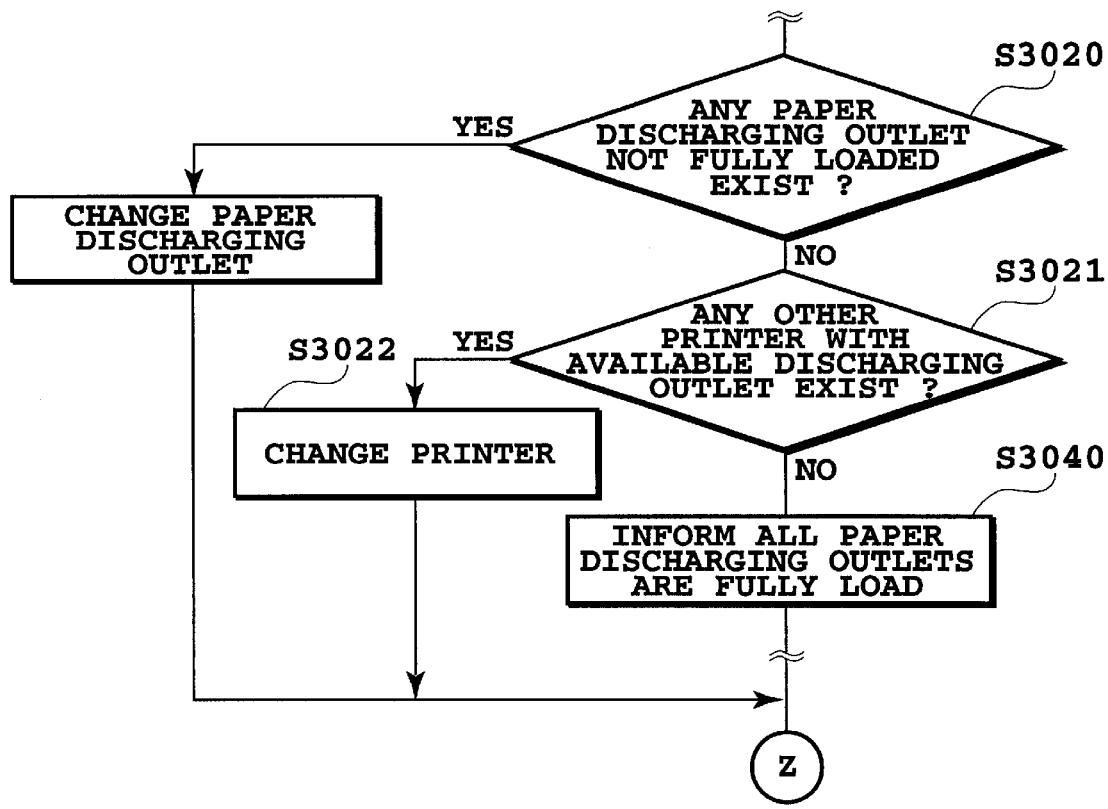
FIG. 7 is a flowchart showing a controlling module executed within the data processing system of the fifth embodiment.

As the fifth embodiment of the present invention, one step S3021 for detecting whether or not there is any other printer having at least one available paper discharging outlet is added before step S3040 of the first embodiment as shown in FIG. 7.

In the first embodiment, the procedure advances considering only one printer to be a target printer. Due to this, at the moment when all the paper-discharging outlets are fully loaded, the printing operation is stopped and an outputted paper-sheet removing operation is required. However, in a case in which a plurality of printers are connected by way of a network or the like, in the moment that the target printer is fully loaded, the procedure attempts to find out a paper-discharging outlet in another printer (S3021), and by automatically using the thus found out printer (S3022), the user's workability is improved, and at the same time the user can make the most of other machines.

The members raised heretofore as one example in the embodiments can be replaced by the following members:

Printer . . . plotter, copy machine, facsimile, etc.

Host . . . personal computer, workstation, mini computer etc.

Control section . . . software, ROM, RAM, etc.

Connecting portion . . . serial interface board, parallel interface board, network interface board, etc.

Storing section . . . memory, magnetic disk unit, optical magnetic disk unit, magnetic tape unit, etc.

Printing section . . . laser beam type, bubble-jet type, LED type, Thermal-transfer type, etc.

Display section . . . CRT, LED, etc.

Paper-discharging outlet . . . finisher, sorter, etc.

Full-up detection section . . . FD unit, MO unit, CD-ROM unit, IC memory card unit, etc.

Recording medium . . . FD, MO, CD-ROM, IC memory card, etc.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true spirit of the invention.

What is claimed is:

1. A printing apparatus for effecting printing of print data on a sheet in accordance with a setting to the print data, said apparatus comprising:

discharging means for discharging sheets on one of a plurality of loading means;

detecting means for detecting a load on each of said loading means;

determining means for determining whether or not the load on a currently-used loading means will exceed a predetermined maximum permissible load on the basis of a result of the detection if another set of sheets following the currently being printed set is discharged to said loading means, during the printing operation of a plurality of sets of sheets to be outputted; and control means for reducing the number of sheets to be discharged to said loading means and then discharging the sheets to said loading means, automatically, regardless of a setting to the print data, when said determining means determines that said loading means is going to be made full, on the basis of the result of the detection.

2. A printing apparatus as claimed in claim 1, wherein said detecting means further comprises:

counting means for counting the number of printed sets of data currently being processed, and page information obtaining means for obtaining the number of pages to be printed out.

3. A printing apparatus as claimed in claim 1, further comprising informing means for informing the user of the fact that said plurality of loading means are all fully loaded, when said printing operation is interrupted.

4. A printing apparatus as claimed 3, further comprising:

second determining means for determining whether or not the outputted sheets of paper have been removed from said loading means; and means for resuming the suspended printing operation when said second determining means determines that the outputted sheets of paper have been removed from said loading means.

5. A printing apparatus as claimed in claim 1, further comprising:

state detecting means for estimating the state of said loading means assuming the case in which the data to be printed are printed, before they are actually printed.

6. A printing apparatus according to claim 5, wherein said state detecting means detects whether or not said loading means will be fully loaded before a predetermined number of sets of data to be printed are all loaded on one of said loading means, and notifies the user if it has been detected that said loading means is going to be fully loaded.

7. A printing apparatus according to claim 5, wherein said state detecting means detects the time interval from the instant that the printing operation of said data to be printed starts to the instant that said loading means is fully loaded with outputted sheets of paper, and informs the user thereof.

8. A printing apparatus as claimed in claim 1, further comprising means for detecting whether or not there is any loading means not fully loaded in another printing apparatus.

9. A printing apparatus according to claim 1, wherein said control means for reducing the number of sheets of paper to be outputted includes means for printing on both faces of each paper to be outputted.

10. A printing apparatus according to claim 1, wherein said control means for reducing the number of sheets of paper to be outputted includes means for changing the size of paper on which data is printed or that of the data itself.

11. A print controlling method for effecting printing of print data on a sheet in accordance with a setting to the print data, said method comprising the steps of:

discharging sheets on one of a plurality of loading means;

detecting a load on each of said loading means;

determining whether or not the load on a currently used loading means will exceed a predetermined maximum permissible load on the basis of a result of the detection, if another set of sheets following the currently being printed set is discharged to said loading means, during the printing operation a plurality of sets of sheets to be outputted; and reducing the number of sheets to be discharged to said loading means and then, discharging the sheets to said loading means, automatically, regardless of a setting to the print data, when said determining step determines that said loading means is going to be made full, on the basis of the result of the detection.

12. A printing controlling method as claimed in claim 11, wherein said detection is carried out based on information obtained from counting means for counting the number of printed sets of data currently being processed, and from means for obtaining the number of pages to be printed out.

13. A print controlling method as claimed in claim 11, wherein said method further comprises a step of informing the user of the fact that said plurality of loading means are all fully loaded, when said printing operation is interrupted.

14. A print controlling method as claimed in claim 13, wherein said method further comprises the steps of:

determining whether or not the outputted sheets of paper have been removed from said loading means; and resuming the suspended printing operation when it is determined that the outputted sheets of paper have been removed from said loading means.

15. A print controlling method according to claim 13, wherein said method further comprises the steps of:

estimating the state of said loading means assuming the case in which the data to be printed are printed before they are actually printed.

16. A print controlling method according to claim 15, wherein said step of estimating the state of said loading means includes the step of detecting whether or not said loading means will be fully loaded, before a predetermined number of sets of data to be printed are all loaded on one of said loading means, and notifying the user if it has been detected that said loading means is going to be fully loaded.

17. A print controlling method as claimed in claim 15, wherein said step of estimating the state of said loading means includes the step of detecting the time interval from the instant that the printing operation of said data to be printed starts to the instant that said loading means is fully loaded with outputted sheets of paper, and informing the user thereof.

18. A print controlling method as claimed in claim 11, wherein said method further comprises the step of detecting whether or not there is any loading means not fully loaded in another printing apparatus.

19. A print controlling method as claimed in claim 11, wherein said step of reducing the number of sheets of paper to be outputted includes the step of printing on both faces of each paper to be outputted.

20. A print controlling method as claimed in claim 11, wherein said step of reducing the number of sheets of paper to be outputted includes the step of changing the size of paper on which data is printed or that of the data itself.

21. A recording medium for storing a control program for executing a print control program by a computer, said control program for effecting printing of print data on a sheet in accordance with a setting to the print data, and said program comprising the steps of:

discharging sheets on one of a plurality of loading means;

detecting a load on each of said loading means;

determining whether or not the load on a currently used loading means will exceed a predetermined maximum permissible load on the basis of a result of the detection, if another set of sheets following the currently being printed set is discharged to said loading means, during the printing operation of a plurality of sets of sheets to be outputted; and reducing the number of sheets to be discharged to said loading means and then, discharging the sheets to said loading means, automatically, regardless of a setting to the print data, when said determining step determines that said loading means is going to be made full, on the basis of the result of the detection.

22. A recording medium for storing a control program for executing a print control program by a computer, said control program for effecting printing of print data on a sheet in accordance with a setting to the print data, and said program comprising the steps of:

discharging sheets on one of a plurality of loading means;

determining whether or not the load on a currently used loading means will exceed a predetermined maximum permissible load on the basis of a result of the detection, if another set of sheets following the currently being printed set is discharged to said loading means, during the printing operation of a plurality of sets of sheets to be outputted; and reducing the number of sheets to be discharged to said loading means and then, discharging the sheets to said loading means, automatically, regardless of a setting to the print data, when said determining step determines that said loading means is going to be made full, on the basis of the result of the detection.

23. A printing apparatus for effecting printing of print data on a sheet in accordance with a setting to the print data, said apparatus comprising:

image forming means for forming an image on a sheet;

discharging means for discharging the image formed sheet to a loading means capable of storing a plurality of sheets; and control means for reducing the number of sheets to be discharged to said loading means and then discharging the sheets to the loading means, automatically, regardless of a setting to the print data, in accordance with information representing a state of the loading means.

24. A printing apparatus according to claim 23, wherein said means for reducing the number of sheets to be discharged to the loading means includes means for changing the size of a sheet on which an image is to be formed, and forming a plurality of images on the same face of the sheet.

25. A printing apparatus according to claim 23, wherein said means for reducing the number of sheets to be discharged to the loading means includes means for changing the size of an image to be formed on a sheet, and forming a plurality of images on the same face of the sheet.

26. A printing apparatus according to claim 23, wherein said means for reducing the number of sheets to be discharged on the loading means includes means for forming the images on the top and back of a sheet, respectively.

27. A printing apparatus according to claim 23, wherein said control means reduces the number of sheets to be discharged to the loading means automatically in accordance with the information on the number of sheets to be discharged to the loading means, regardless of a setting to the print data.

28. A printing apparatus according to claim 27, wherein said information contains information concerning a maximum permissible storage amount.

29. A printing apparatus according to claim 27, wherein said information contains information concerning a load amount of sheets stored in advance in said loading means.

30. A printing apparatus according to claim 23, further comprising: means for inquiring of an operator as to whether or not reducing the number of sheets is executable, and wherein said control means executes a sheet-reducing step in response to an answer from the operator to said inquiring.

31. A control method for a printing apparatus for effecting a printing of print data on a sheet in accordance with a setting to the print data, said apparatus, which has image forming means for forming an image on a sheet and discharging means for discharging the image formed sheet to a loading means capable of storing a plurality of sheets, and said method comprising the steps of:

a reducing step of executing a process for reducing the number of sheets to be discharged to said loading means, automatically regardless of a setting, to the print data in accordance with information representing a state of the loading means; and a step of discharging the sheets to the loading means after performing the process for reducing the number of sheets in said reducing step.

32. A control method for a printing apparatus according to claim 31, wherein the step of reducing the number of sheets to be discharged to the loading means includes the steps of charging the size of a sheet on which an image is to be formed, and then, forming a plurality of images on the same face of the sheet.

33. A control method for a printing apparatus according to claim 31, wherein the step of reducing the number of sheets to be discharged to the loading means includes the steps of changing the size of an image to be formed on a sheet, and then, forming a plurality of images on the same face of the sheet.

34. A control method for a printing apparatus according to claim 31, wherein the step of reducing the number of sheets to be discharged to the loading means includes the step of forming images, respectively, on the top and back of a sheet.

35. A control method for a printing apparatus according to claim 31, wherein said control step performs said step of reducing the number of sheets to be discharged to the loading means automatically without instructions from an operator in accordance with the information on the number of sheets to be discharged to the loading means.

36. A control method for a printing apparatus according to claim 31, wherein said information includes information concerning a maximum permissible storage amount.

37. A control method for a printing apparatus according to claim 31, wherein said information includes information concerning a load amount of sheets that have already been stored in said loading means.

38. A control method for a printing apparatus according to claim 31, further comprising the step of inquiring of an operator as to whether or not to execute the step of reducing the number of sheets, and said reducing step executes said process for reducing the number of sheets in response to an answer from an operator to said inquiring.

39. A control method for a printing apparatus according to claim 31, wherein said reducing step performs said process so that the total amount of sheets of said loading means does not exceed a maximum storage amount.

40. A control method for a printing apparatus according to claim 31, further comprising the step of notifying said information showing said state of said loading means.

41. A control method for a printing apparatus according to claim 31, wherein said printing apparatus performs a printing process of the print data from an external apparatus.

42. A control method for a printing apparatus according to claim 41, further comprising the step of notifying an information, showing the condition that sheets which are used for the print data from said external apparatus are not outputted to said loading means in full to said external apparatus.

43. A control method for a printing apparatus according to claim 42, wherein said information of said notifying step is notified in advance before said process of said reducing step.

44. A control method for a printing apparatus according to claim 31, wherein said printing apparatus selectively discharges sheets into a plurality of loading means and said reducing step performs said process so that sheets in the same group are not divided into a plurality of loading means.

45. A control method for a printing apparatus according to claim 31, wherein said printing apparatus is connected to a network.

46. A control method for a printing apparatus according to claim 45, further comprising the step of utilizing loading means of another printing apparatus different from said printing apparatus on condition that a plurality of printing apparatus including said printing apparatus is connected to said network.

47. A computer readable recording medium storing a program instructing a printing apparatus to perform a process for effecting printing of print data on a sheet in accordance with a setting to the print data, said process comprising the steps of:

a reducing step of executing a process for reducing the number of sheets to be discharged to said loading means, automatically regardless of a setting, to the print data in accordance with information representing a state of the loading means; and a step of discharging the sheet to the loading means after performing the process for reducing the number of sheets in said reducing step.

48. A recording medium according to claim 47, wherein said steps of reducing the number of sheets to be discharged to the loading means includes the steps of changing the size of a sheet on which an image is to be formed, and forming a plurality of images on the same face of the sheet.

49. A recording medium according to claim 47, wherein said step of reducing the number of sheets to be discharged to the loading means includes the steps of changing the size of an image to be formed on a sheet, and forming a plurality of images on the same face of the sheet.

50. A recording medium according to claim 47, wherein said step of reducing the number of sheets to be discharged to the loading means includes the step of forming images, respectively, on the top and back of a sheet.

51. A recording medium according to claim 47, wherein said reducing step automatically reduces the number of sheets to be discharged to the loading means in accordance with the information and the number of sheets to be discharged to the loading means regardless of a setting to the print data.

52. A recording medium according to claim 51, wherein said information includes information concerning a maximum storage amount.

53. A recording medium according to claim 51, wherein said information includes information concerning the load amount of sheets that has already been stored in said loading means.

54. A recording medium according to claim 47, further comprising the step of:

inquiring of an operator as to whether or not said means for reducing the number of sheets is executable, said reducing step being executed in response to an answer from an operator to said inquiring.

* * * * *

UNITED STATES PATENT AND TRADEMARK OFFICE
CERTIFICATE OF CORRECTION

PATENT NO.   : 6,587,218 B2
DATED        : July 1, 2003
INVENTOR(S)  : Akihiko Noda It is certified that error appears in the above-identified patent and that said Letters Patent is hereby corrected as shown below:

Title page,
Item [56], References Cited, U.S. PATENT DOCUMENTS, insert the following:
-- 5,551,686    9/1996    Sanchez et al. ………….. 271/298
5,464,201    11/1995    Deen et al. …………….. 355/324 --.

Column 1,
Line 13, "data" should read -- a data --.

Column 2,
Line 16, "for" should read -- in --.
Line 19, "lot," should read -- lot of users, --.
Line 21, "using" should read -- used --.
Line 49, "currently using paper discharging" should read
-- currently-used paper-discharging --.

Column 3,
Lines 21 and 57, "computer:" should read -- computer perform the steps of: --.
Line 28, "currently using" should read -- currently used --.

Column 5,
Line 34, "are" should read -- is --.

Column 7,
Line 49, "section" should read -- sections --.

Column 8,
Line 41, "notifies" should read -- notifies the user --.

Column 9,
Line 11, "photosenser" should read -- photosensor --.

UNITED STATES PATENT AND TRADEMARK OFFICE
CERTIFICATE OF CORRECTION

PATENT NO.   : 6,587,218 B2
DATED        : July 1, 2003
INVENTOR(S)  : Akihiko Noda It is certified that error appears in the above-identified patent and that said Letters Patent is hereby corrected as shown below:

<u>Column 10,</u>
Line 16, "11-opage" should read -- 11-page --.
Line 23, "the number of" should read -- an additional --.

Signed and Sealed this

Second Day of March, 2004

JON W. DUDAS
*Acting Director of the United States Patent and Trademark Office*